US008608188B2

(12) United States Patent
Goldszer

(10) Patent No.: US 8,608,188 B2
(45) Date of Patent: *Dec. 17, 2013

(54) LIGHT DUTY CART

(75) Inventor: Jacob Goldszer, Hollywood, FL (US)

(73) Assignee: JGR Copa, LLC, Hollywood, FL (US)

( * ) Notice: Subject to any disclaimer, the term of this patent is extended or adjusted under 35 U.S.C. 154(b) by 111 days.

This patent is subject to a terminal disclaimer.

(21) Appl. No.: 13/185,621

(22) Filed: Jul. 19, 2011

(65) Prior Publication Data

US 2012/0104731 A1    May 3, 2012

Related U.S. Application Data

(60) Provisional application No. 61/409,570, filed on Nov. 3, 2010.

(51) Int. Cl.
B62B 5/00 (2006.01)
A47B 3/08 (2006.01)
B62B 1/00 (2006.01)

(52) U.S. Cl.
CPC . A47B 3/08 (2013.01); B62B 1/008 (2013.01); B62B 2206/006 (2013.01)
USPC ......................................................... 280/651

(58) Field of Classification Search
CPC ........ B26B 5/00; B26B 3/02; B26B 2205/00; B26B 2205/30; B26B 1/12; A47B 3/0818; A47B 31/04; A47B 3/10; B25H 1/04; B60B 33/0042
USPC ................... 280/651, 659, 652, 654, 655, 30; 108/132; 403/83, 84
See application file for complete search history.

(56) References Cited

U.S. PATENT DOCUMENTS

| 1,718,962 | A | * | 7/1929 | Kimball | 280/655 |
| D160,659 | S | | 10/1950 | Reece | D34/24 |
| D165,191 | S | | 11/1951 | Reece | D34/24 |
| D180,868 | S | * | 8/1957 | Diehl | D34/24 |
| 3,191,958 | A | | 6/1965 | Smith | |
| 3,627,342 | A | | 12/1971 | Morellet | 280/36 B |
| 3,677,571 | A | | 7/1972 | Maturo, Jr. et al. | 280/36 R |
| 3,693,993 | A | | 9/1972 | Mazzarelli et al. | 280/30 |
| 4,044,931 | A | * | 8/1977 | Catelli | 224/155 |
| 4,055,357 | A | | 10/1977 | Sorocin | 280/641 |
| 4,222,585 | A | | 9/1980 | Crothers | 280/654 |
| 4,248,453 | A | * | 2/1981 | Stark | 280/655 |
| 4,266,807 | A | | 5/1981 | Griffin | 280/650 |
| 4,355,818 | A | * | 10/1982 | Watts | 280/654 |
| 4,362,307 | A | * | 12/1982 | Nakatani | 280/30 |
| 4,429,897 | A | | 2/1984 | Friedman et al. | 280/646 |

(Continued)

Primary Examiner — John R Olszewski
Assistant Examiner — Brian Cassidy
(74) Attorney, Agent, or Firm — Robert C. Kain, Jr.

(57) ABSTRACT

The foldable frame cart carries items and doubles as a table. A main-frame has a pivotally attached upper framework, a lower frame stand and wheels attached to the main-frame. A panel attaches to the cart space defining members. The cart is a table when the main-frame is positioned horizontally on the ground. The upper and lower framework are fully extended. The cart has swivel locks. A lower swing arm safety latch system maintains the first frame stand in a fully extended position with respect to the main-frame. An off center swing hinge lock system pivotally attaches the upper framework to the main-frame. The hinge lock systems prohibits unintentional closure or collapse of the framework from its fully extended position with respect to the plane of the main-frame.

38 Claims, 7 Drawing Sheets

(56) References Cited

U.S. PATENT DOCUMENTS

| | | | |
|---|---|---|---|
| 4,586,721 A * | 5/1986 | Harada et al. | 280/30 |
| 4,703,944 A | 11/1987 | Higson | 280/30 |
| 4,790,559 A | 12/1988 | Edmonds | 280/655 |
| 4,865,346 A | 9/1989 | Carlile | 280/654 |
| 4,887,837 A | 12/1989 | Bonewicz, Jr. et al. | 280/654 |
| 5,056,804 A * | 10/1991 | Wilson et al. | 280/30 |
| 5,197,754 A | 3/1993 | Ward | 280/655 |
| D342,363 S | 12/1993 | Stein | D34/26 |
| D365,187 S | 12/1995 | Tsai | D34/26 |
| 5,542,639 A * | 8/1996 | Wixey et al. | 248/439 |
| 5,636,852 A * | 6/1997 | Sistrunk et al. | 280/30 |
| 5,642,895 A * | 7/1997 | Wunder | 280/30 |
| D401,729 S | 11/1998 | Wu | D34/26 |
| 5,863,055 A | 1/1999 | Kasravi et al. | 280/47.29 |
| 5,915,722 A | 6/1999 | Thrasher et al. | 280/649 |
| 5,988,671 A | 11/1999 | Abelbeck et al. | 280/649 |
| 6,000,713 A * | 12/1999 | Lin | 280/647 |
| 6,209,892 B1 * | 4/2001 | Schaaf et al. | 280/33.993 |
| D448,907 S | 10/2001 | Tsai | D34/26 |
| 6,375,200 B1 * | 4/2002 | Harter | 280/30 |
| 6,520,574 B1 * | 2/2003 | Huang | 297/184.16 |
| D479,761 S | 9/2003 | Tsai | D34/24 |
| 6,880,851 B1 * | 4/2005 | Summers et al. | 280/652 |
| D553,325 S | 10/2007 | Miller et al. | D34/24 |
| D633,679 S | 3/2011 | DeLuca | D34/23 |
| 7,988,120 B2 * | 8/2011 | Hsu | 248/439 |
| 8,070,181 B2 * | 12/2011 | Forrest et al. | 280/651 |
| 8,182,030 B1 * | 5/2012 | Britten | 297/129 |
| 2002/0101065 A1 | 8/2002 | McCollum et al. | 280/655 |
| 2003/0234515 A1 | 12/2003 | Han | 280/655 |

\* cited by examiner

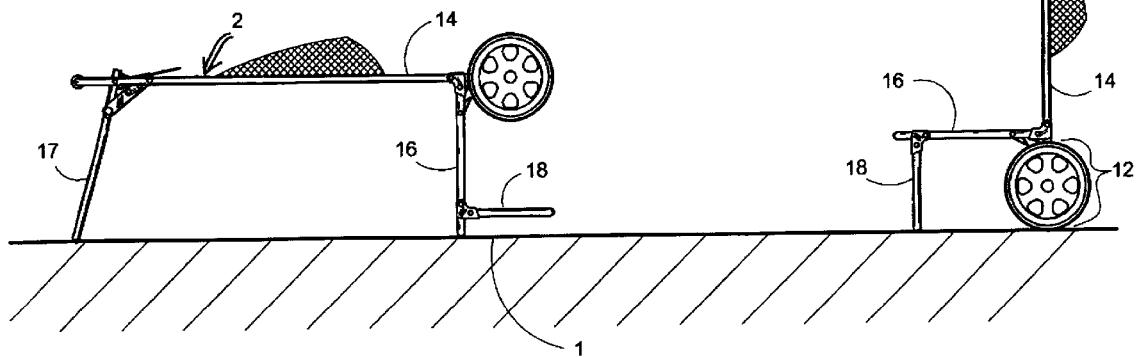
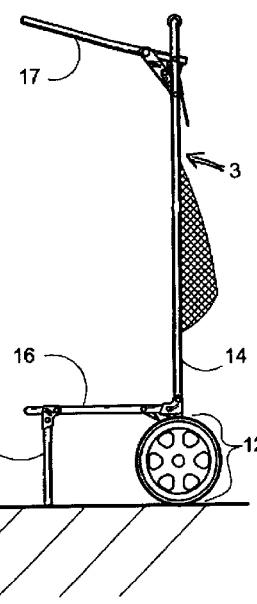

LIGHT DUTY CART

This is a regular patent based upon and claiming the benefit of provisional patent application Ser. No. 61/409,570 filed Nov. 3, 2010, now pending, the contents of which is incorporated herein by reference thereto.

The present invention relates to a cart with foldable frame members that can be used to carry items such as beach chairs, coolers, towels, blankets, and food stuffs. The cart can also double as a table.

OBJECTS OF THE INVENTION

It is an object of the present invention to provide a lightweight cart with foldable or collapsible frame members that can easily be folded into a compact structure and stowed in a trunk of a car and, in another mode, unfolded such that the frame can hold items such as beach chairs and coolers.

It is a further object of the present invention to provide a table for placing items onto when the frame members are in the fully extended or unfolded position.

It is another object of the present invention to provide improved, multiple locking systems to keep the foldable frame members of the cart fully extended with respect to each other.

BACKGROUND OF THE INVENTION

Certain types of carts are known which collapse into a compact shape such that the cart can be stowed in the trunk of an automobile and carried reasonable distances and, with some ease, opened up such that the wheeled cart can carry beach towels, chairs, a cooler, blankets and other items commonly used by persons.

Examples of collapsible carts are disclosed in: U.S. Pat. Nos. 5,915,722; 5,988,671; 3,191,958; 3,627,342; 3,677,571; 3,693,993; 4,055,357; 4,222,585; 4,266,807; 4,429,897; 4,703,944; 4,790,559; 4,865,346; 4,887,837; and 5,197,754. Other carts are disclosed in U.S. Pat. No. 5,915,722 to Thrasher and U.S. Pat. No. 5,988,671 to Abelback wherein the beach cart is collapsible but the lower frame of these beach carts are hinged to the forward legs and the rear legs.

SUMMARY OF THE INVENTION

The foldable light duty cart is adopted to carry items such as beach chairs, coolers, towels blankets and food stuffs. The cart includes a main-frame structure including opposing rigid main-frame side frame members and at least one cross bar member spanning the main-frame side frame members. Wheels are rotatably mounted near the bottom portions of the main-frame side members such that when the cart stands up, the lower frame elements act as a stand system. A pair of wheels are rotatably mounted near a terminal bottom end of each of the main-frame side frame members.

A panel (typically cloth or nylon) is attached between the main-frame side members. The panel covers a portion of the rectangular enclosed the cart space formed by the main-frame members. The panel may be cloth, a rigid panel, or a flexible panel.

A pivotally mounted upper framework is coupled to the upper portions of the main-frame side members. The upper framework includes opposing rigid upper framework side frame elements and at least one rigid upper framework cross bar element spanning the upper framework side elements.

A lower frame stand is pivotally attached to lower portions of the main-frame side members. The lower frame stand includes first and second frame stand segments. The first frame stand segment is pivotally attached to lower portions of the main-frame side members.

The first frame stand segment includes opposing rigid first frame stand side supports and at least one first frame stand cross bar support therebetween. The terminal ends of the first frame stand side supports are pivotally attached to the lower portions of the main-frame side members. The first frame stand segment has a collapsed position and a fully extended position. In its fully extended position, the first frame stand segment is perpendicular to the plane of the main-frame structure. In its collapsed position, the first frame stand side supports are substantially adjacent to or near the main-frame side members.

The second frame stand segment is pivotally attached to the first frame stand segment. When the fully extended, the second frame stand segment forms an L-shaped stand with the first frame stand segment. The second frame stand segment includes at least opposing rigid second frame stand legs. The terminal ends of the second frame stand legs are pivotally attached to the first frame stand side supports. The second frame stand segment has a collapsed position and a fully extended position. In its fully extended position, the second frame stand segment is perpendicular to the plane of the first frame stand segment forming the L-shape. In its collapsed position, the second frame stand segment and the second frame stand side legs are adjacent to or near the second frame stand segment side supports.

The upper and lower locks are one of several important aspects of the present invention. The cart includes a lower swivel lock that pivotally connects the main-frame structure to the first frame stand segment. The lower swivel lock has a body, a frame channel, and channel side walls. The lower swivel channel side walls are pivotally attached to one of the main-frame side members. The lower swivel body is attached to the terminal end adjacent first frame stand side support. The lower swivel frame channel captures the main-frame side member therein when the lower frame stand segment and the first frame stand segment is substantially perpendicular to the main-frame side member in a fully extended position. When the main-frame side member is not captured in the lower swivel frame channel, the lower frame stand is adapted to swing to a collapsed position near the main-frame side member. The lower swivel channel may also have at least one lower swivel detent therein to capture and lock the main-frame side member in the frame channel when in the fully extended position.

The light duty cart also includes a stand swivel lock that pivotally connects the first frame stand segment to the second frame stand segment. The stand swivel lock has a body, a frame channel, and channel side walls. The stand swivel channel side walls are pivotally attached to one of the first frame stand side supports. The stand swivel body is attached to the terminal end of an adjacent second frame stand side leg. The stand swivel frame channel captures the first frame stand side support therein when the first frame stand segment is substantially perpendicular to the second frame stand segment and in a fully extended position. When the first frame stand side support is not captured in the stand swivel frame channel, the second frame stand segment is adapted to swing to a collapsed position adjacent to the second frame stand segment. The stand swivel channel may also have at least one lower swivel detent therein to capture and lock the second frame stand segment when in the fully extended position.

The light duty car also includes a lower swing arm safety latch system between one of the first frame stand side supports and an adjacent main-frame side member. The lower swing arm latch safety system has a swing arm with a catch mouth at one end thereof and the other end thereof pivotally mounted to one of the first frame stand side supports. The latch system also includes a pin on the adjacent main-frame side member at a location such that upon rotation of the swing arm, the catch mouth accepts and retains the pin therein. The swing arm latches the first frame stand to the main-frame to maintain the first frame stand in a fully extended position, generally L-position, with respect to the main-frame.

The light duty cart also includes an off center swing hinge lock system between one of the main-frame side members and an adjacent upper framework side element. The lock prohibits unintentional closure or collapse of the framework from its fully extended generally L-position with respect to the plane of the main-frame. The off center swing hinge lock system includes a first hinge arm and a second hinge arm (which arms are pivotally connected and each arm is otherwise respectively pivotally coupled to the upper framework side element and the main-frame side member. The first and second hinge arms are pivotally attached to each other at an arm pivot point. The first hinge arm includes a stop or lip and the second hinge arm has an edge co-acting with the lip stop. When the first and second hinge arms are fully extended they are generally linearly aligned with respect to each other but are further over-extended beyond the longitudinal centerline of each arm. When in the fully extended position, the arm pivot point linking both hinge arms is inboard with respect to an imaginary line through the pivotal coupling attaching the first hinge arm and the upper framework side element and the pivotal coupling attaching the second hinge arm and the main-frame side member.

DESCRIPTION OF DRAWINGS

Further objects and advantages of the present invention can be found in the detailed description of the preferred embodiments, when taken in conjunction with the accompanying drawings in which:

FIG. 5A diagrammatically illustrates a side view the cart as a table.

FIG. 5B diagrammatically illustrates a side view of the cart in an upright position.

DETAILED DESCRIPTION OF THE PREFERRED EMBODIMENTS

The present invention relates to a cart with collapsible or foldable frame members that can be used to carry items such as beach chairs, coolers, towels, blankets and food stuffs. Also, the cart can also be used as a table.

Figure 1:
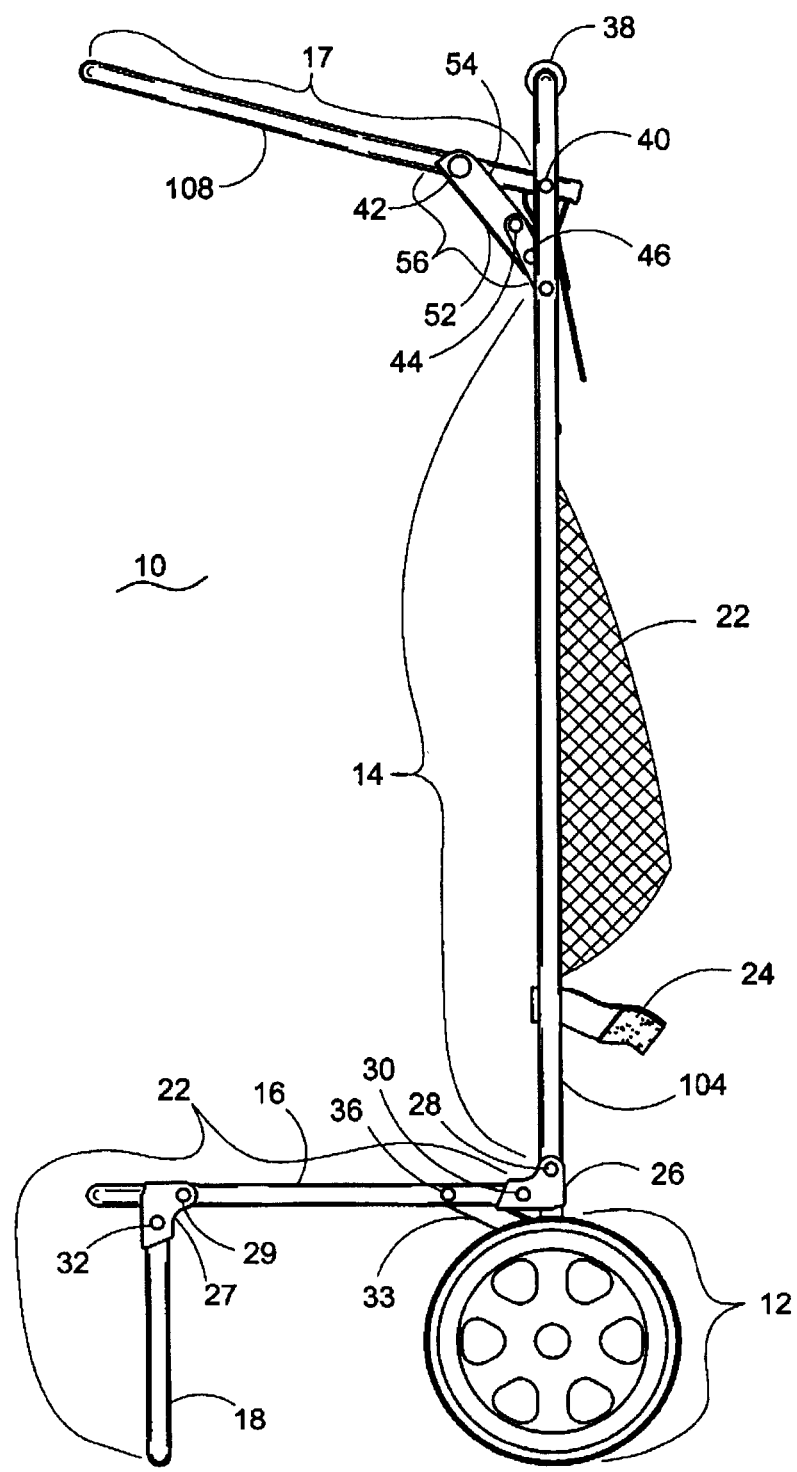
FIG. 1 diagrammatically illustrates a side view of the light duty cart in an upright position with fully extended frame supports and frame elements. The upper framework is in the locked generally L-position with respect to the main frame. The lower framework stand is in the locked generally L-position with respect to the main frame.
Figure 6:
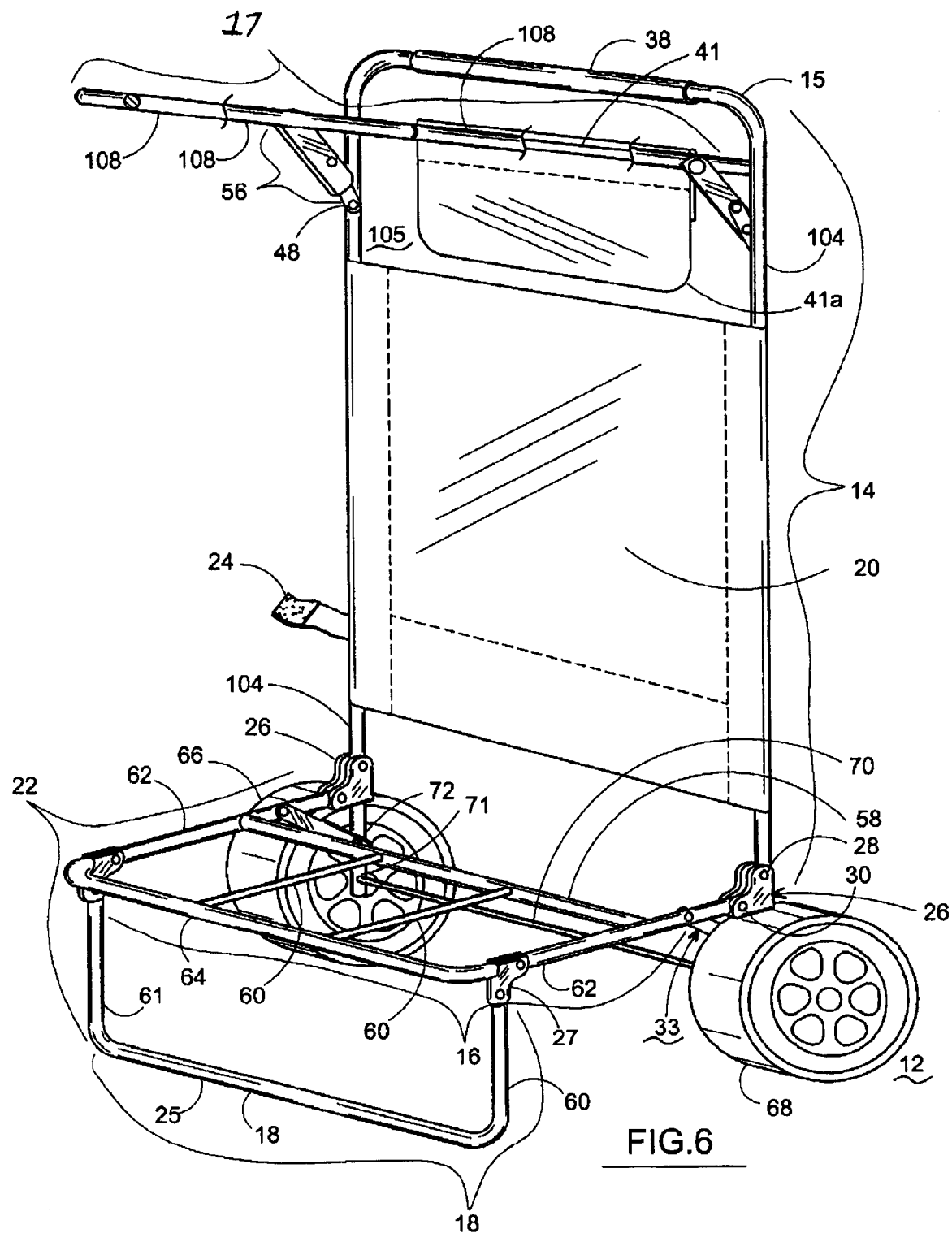
FIG. 6 diagrammatically illustrates a perspective view of the cart in accordance with the preferred embodiments of the present invention.

FIG. 1 diagrammatically illustrates a side elevational view of light duty cart 10. Similar numbers designate similar items throughout the drawings. FIGS. 1 and 6 are described concurrently herewith. Cart 10 includes a main-frame structure 14 that can be made from several main-frame members or struts.

The main-frame structure 14 includes two opposing rigid main-frame side frame members 104 and a rigid main-frame cross bar frame member 15 spanning the side main-frames side frame members 104 (see FIG. 6). The frames and framework elements can be bars or tubes or rods havig various different cross-sectional shapes (round, square, oval) and sizes, different than those shown in the drawings. It should also be mentioned that in one of the preferred embodiments, the frame sections are fabricated from tubular steel or other metallic composites. However, the frame sections may be made from any suitable material such as plastic or the like.

As shown in FIG. 6, in one of the preferred embodiments, the main-frame 14 can be U-shaped, wherein the cross bar member 15 formed at the terminal ends of two opposing rigid side frame members 104 defining the shape of the letter U (an inverted U in FIG. 6). In another embodiment, the structure 14 can define the shape of the letter H or include multiple cross bars which define a rectangle or square cart space 105.

The main-frame side members 104 and the main-frame cross member 15 partly enclose a cart space 105. In the illustrated embodiment, a rectangular cart space 105 is defined by frame rails 104 and end cross piece or rail 38. A panel 20 partly covers the cart space 105 and is more fully described later in connection with FIG. 6.

A pivotally mounted wheel system 12 is pivotally attached near the bottom portions of the main-frame side frame members 104. As later explained in FIG. 6, in one of the preferred embodiments, the wheel system includes a pair of wheels.

A pivotally mounted upper framework 17 is coupled near the top portions of the main-frame side members 104. See FIG. 1. Upper framework 17 defines a U-shape that is explained in FIG. 6. The upper framework 17 can be fully extended (as shown in FIG. 1) to an L-position or can be in a collapsed position (not completely shown, but see FIG. 2A) with respect to the main-frame structure 14.

Figure 2B:
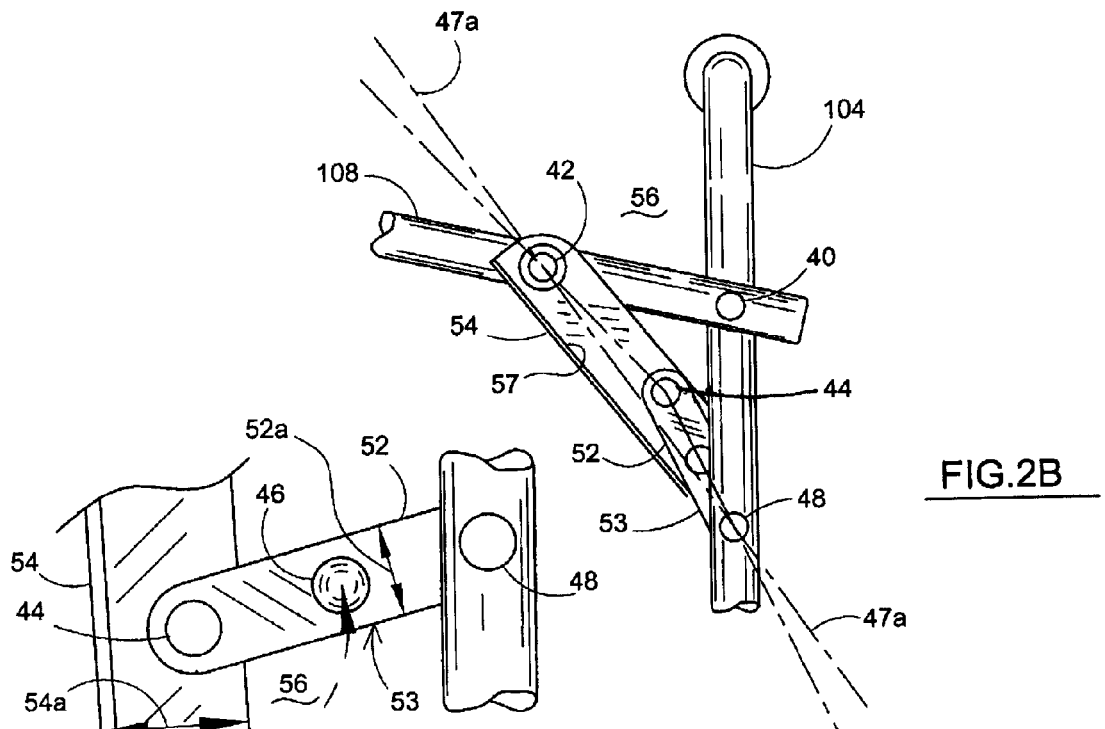
FIG. 2B diagrammatically illustrates a side view of the off center swing hinge lock system when the first and second hinge arms are fully extended in an off-center locked position.
Figure 2C:
FIG. 2C diagrammatically illustrates a side view of the off center swing hinge lock system in a partly collapsed position highlighting the detents on the hinge. This view is enlarged to highlight the detents.
Figure 2A:
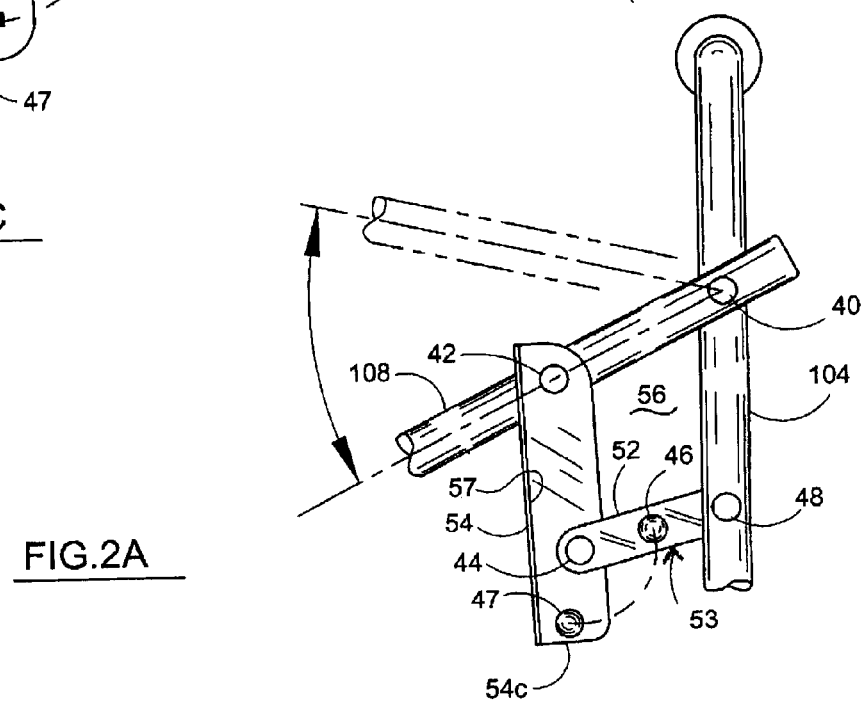
FIG. 2A diagrammatically illustrates a side view of the off center swing hinge lock system for the upper framework in a partly collapsed position.

FIG. 2A shows the framework side elements 108 in a partly collapsed position. When in its collapsed position, the upper framework 17 is adjacent to the main-frame 14. When the framework 17 is in its fully extended position (see FIG. 1), the framework 17 protrudes almost perpendicular from the plane of the main-frame 14. It is substantially perpendicular to the main-frame 14. In its fully extended position, the upper framework 17 can be used as one of the table supports such that the cart can be used as a table (see FIG. 5A).

An off center swing hinge lock system 56 locks upper framework 17 with respect to main-frame structure 14. See detail in FIG. 2B. When the framework 17 is fully extended, the framework 17 is securely locked with respect to the main-frame structure 14 and does not move when longitudinal forces parallel to longitudinal aspect of the main-frame 14 act upon framework 17 (these forces are normal to the framework 17 plane). The off center swing hinge lock system 56 prohibits unintentional closure or collapse of the framework 17 from its fully extended L-position. The hinge lock system 56 includes a first hinge arm 54 and a second hinge arm 52 and is later described (see FIGS. 2A, 2B, 2C).

A lower frame stand 22 (see FIG. 1) is pivotally coupled near the bottom portion of the main-frame structure 14. The lower frame stand 22 includes a first frame stand segment 16 and a second frame stand segment 18 (see FIG. 6 for explanation of the shape defined by first and second frame stand (16, 18). When the cart 10 is standing in an upright position (see FIG. 1), the lower frame stand 22 is fully extended to an L-position relative to main frame members 104. When the lower frame stand 22 is fully extended, the first frame stand segment 16 is perpendicular to the main-frame 14, and the second frame stand segment 18 is perpendicular to the first frame stand segment 16. Segment 18 being almost parallel to main frame rails 104. When the lower frame stand 22 is in the collapsed position (not fully shown), segments 16,18 are adjacent to or near the main-frame 14. See FIG. 4A.

Frame segment 16 is pivotally attached to the main-frame 14 structure by a lower swivel lock 26. See detail at FIG. 3A. The lower swivel lock 26 permits frame segment 16 to swing from its fully extended L-position to its collapsed position. (see FIG. 3A for explanation of the lower swivel 26 lock). When the lower frame stand 22 is in its fully extended position, a lower swing arm safety latch system 33 further secures the first frame stand 22 in its fully extended position (see FIGS. 4A and 4B for description of the lower swing arm safety latch system 33).

Frame segment 18 is rotatably or pivotally attached to segment 16 such that upon full extension of frame segment 16 (such that the lower frame stand segment 16 is perpendicular to the main-frame 14), and the full extension of frame segment 18, the cart 10 stands upright. The wheels 12, main frame members 104 and frame segments 16, 18 (for stand 22) form a base stand for cart 10. Segment 18 rotatably attaches to segment 16 with a stand swivel lock 27. The swivel lock 27 allows frame segment 18 to swing from its fully extended position (FIG. 1) to its fully collapsed position (not fully shown) and also can lock frame segment 18 in its fully extended position. In its fully extended position, frame segment 18 is substantially perpendicular to frame segment 16. When in its collapsed position (not fully shown), segment 18 is adjacent to the plane of segment 16 (see FIG. 3A for explanation of the lower swivel 26 lock). When completely collapsed frame segment 18 lays next to segment 16, both segments pivot to lay next to main frame bars 104.

FIG. 2A diagrammatically illustrates a side view of off center swing hinge lock system 56 for upper framework 17. The hinge lock system 56 prohibits unintentional closure or collapse of the framework 17 from the fully extended L-position. The hinge lock system 56 includes two hinge arms, each having a planar elongated shape. The first hinge arm 54 and the second hinge arm 52 are rotatably coupled to each other at arm pivot point 44. The position of arm pivot point 44 is generally near the terminal ends of the arms 54, 52.

The hinge lock system 56 is located between the upper framework 17 and the main-frame structure 14. More specifically, the hinge lock system 56 is located between one of the main-frame side members 104 and an adjacent upper framework side element 108. As shown in FIG. 6, in one embodiment, two hinge lock systems 56 operate on opposing frame members 108. The same is true for swivel lock 26 and swing arm lock 33. Each frame rail has a lock therebetween. The first hinge arm 54 in FIGS. 2A, 2B and 2C is pivotally or hingedly attached to the side of the upper framework side element 108 by pivotal fastener 42. FIG. 2B shows arm 54 on the outside of side element 108 and arm 52 on the inside of main-frame side member 104. The second hinge arm 52 pivotally attaches near the top of main-frame side member 104 on the inside of the side member 104. The term "inside" refers to a position generally inboard the rectangular main-frame members in cart space 105 (FIG. 6). "Outside" refers to items outside of cart space 105.

The hinge lock system 56 has a locked position or fully extended off-center position (see FIG. 2B) and an unlocked collapsed position (see FIG. 2A). In the locked position (FIG. 2B), the arm pivot point 44 for arms 52, 54 is closer to the main frame pivotal attachment 40 than when the hinge lock system 56 is in an unlocked position (FIG. 2A). In the locked position, the arms 52, 54 are extended generally linearly with respect to each other and further are over-extended beyond the longitudinal centerline of each arm. See deviated dashed lines which are off set from line 47a. Line 47a passes through frame rail pivot points 42, 48. When the hinge lock system 54 is in its unlocked and collapsed position (see FIG. 2A), the arms 52, 54 are collapsed and are generally adjacent to each other. Arms 52, 54 may lay atop each other when fully collapsed. When arm 54 and arm 52 are fully extended and in the locked position (FIG. 2B), the arm pivot point 44 is inboard with respect to an imaginary line 47a through the pivotal coupling 42 and pivotal coupling 48. Couplings 42, 48 are at opposite ends of each arm 54, 52 away from arm pivot point 44. The term "inboard" means nearer or closer to the main-frame than another point of reference.

Arm 54 includes a stop 57 protruding or extending from the outboard surface of the arm that coacts or abuts edge 53 of the second hinge aim 52. The stop 57 of the first hinge arm 54 can have various embodiments. In one embodiment, the stop 57 is an outboard protruding or extending lip, normal to the plane of the arm, on an edge of arm 54. The stop 57 can also be a pin extending outboard from the plane of arm 54, distal to side frame coupling 40. Lip stop 57 protrudes perpendicularly from the plane of arm 54 toward arm 52. The protruding lip stop 57 on arm 54 abuts or stops the edge 53 on arm 52 such that when the hinge lock system 56 is fully extended (more properly over-extended), the lip stop 57 stops the edge 53 of the arm 52 and stops further inboard movement of pivot point 44 towards pivot coupling 40. In one embodiment, the protruding lip 57 is greater than the width or thickness of arm 52. In another embodiment, the extension of the lip stop 57 is less than the thickness of the edge 53 so long as lip stop 57 can stop the edge 53 of arm 52 from passing therebeyond. In another embodiment, the lip-stop can be a pin or ball or rivet. It is sufficient that arm 52 is stopped by a structure on arm 54 at the off-center position of FIG. 2B. In all of the embodiments, when the cart 10 is an upright position and upper framework 17 is fully extended with respect to the main-frame (see FIG. 1), arm lip stop 57 prevents the edge 53 of arm 52 from passing beyond the stop limit such that the upper framework 17 does not move when forces act downward on framework 17 (FIG. 1) or parallel to the longitudinal aspect or plane formed by main-frame 14 (rails 104).

The arm pivot point 44 of arms 52, 54 (FIG. 2A, B) may be at various positions on the arms as long as pivot point 44 is located away from or distal to the end 54c of arm 54 (FIG. 2C). The edge 53 of the second swing arm 52 abuts the lip stop 57 in FIG. 2B.

In one embodiment, the arm pivot point 44 is inboard or is positioned towards frame pivot 40 such that line 47a is not aligned the longitudinal centerlines of hinge arms 54, 52. See dashed centerlines through arms 54, 52.

As mentioned earlier, the hinge arms 52, 54 have an elongated planar shape. In one embodiment, the first hinge arm 54 is longer in length than the second hinge arm 52. In another embodiment, the second hinge arm 54 is the same or has a longer length than the first hinge arm 52.

The hinge lock system 56 may include a pair of complementary detents. In FIG. 2C, the pair of detents is shown as a first detent 47 on the first swing arm 54 and a complementary second detent 53 on the second hinge arm 52. The first swing arm detent 47 is located near one end (distally located from pivot coupling 42) of arm 54 below arm pivot point 44. The detent shapes should be complementary (a bump matches a depression). The second swing arm detent 46 is located on arm 52 between the arm pivot point 44 and the pivotal coupling or fastener 48. The detents should be aligned atop each other when the hinge lock system 56 is locked off-center (FIG. 2B) and pivot point 44 is inboard towards frame pivot 40.

The complementary detents may have different, but complementary shapes and sizes. In one embodiment, the detent 47 of arm 54 extends or protrudes outward from the plane of arm 54 towards arm 52. The detent 46 of arm 52 is a complementary depression on or in arm 52. In another embodiment, the detents 46, 47 are oppositely configured such that detent 47 is a depression or hole and detent 46 is a protrusion. In both embodiments, when the hinge lock system 56 is fully extended off-center, the first detent 47 fits into the complementary second detent 46 causing arms 52, 54 to lock and further prevent the upper framework from moving or collapsing when forces with respect to the main-frame 14 plane act upon it. Therefore, a double lack system is provided on the upper frames 17 and rails 104 with off-center lock 56 and detents 46, 47. See FIG. 1.

Figure 3A:
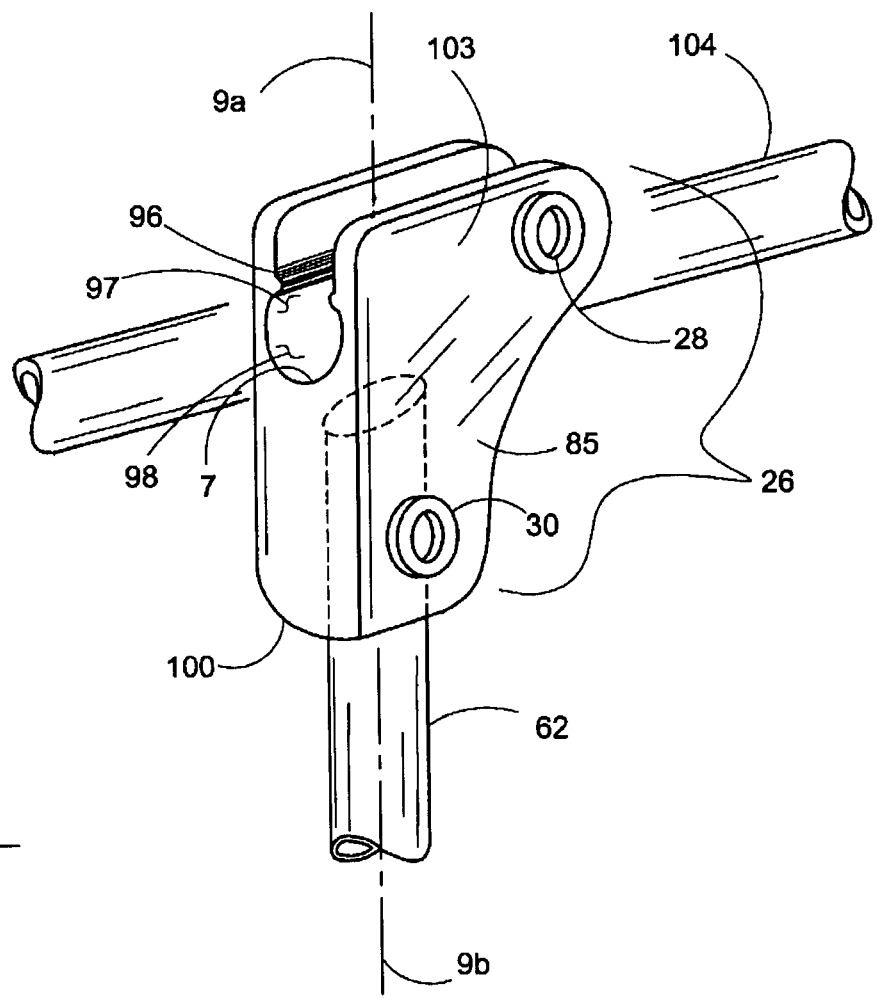
FIGS. 3A and 3B diagrammatically illustrate a perspective view of one of the preferred embodiments of the lower swivel lock between the main-frame and the lower frame stand (FIG. 3A) and the lower frame stand and the frame legs (FIG. 3B).
Figure 3B:
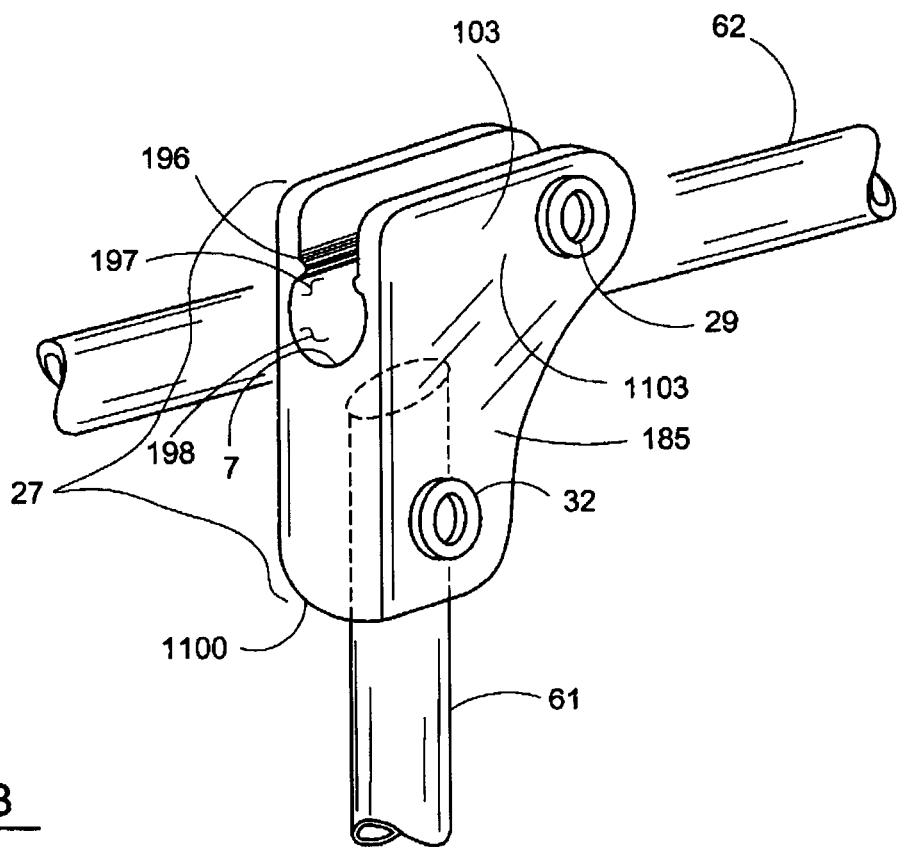

FIGS. 3A and 3B diagrammatically illustrate a perspective view of one of the preferred embodiment of swivel locks 26, 27 between the main-frame and the lower frame stand (FIG. 3A) and the lower frame stand and the frame legs (FIG. 3B). In many respects, the swivel locks are similar. The lower swivel lock 26 and the stand swivel lock 27 are substantially the same except for their respective locations on the cart 10 and swing arm lock 33 between stand 22 and frame rails 104. In one of the preferred embodiments, the swivel lock 27 and swivel lock 26 are fabricated from suitable material such that they are resilient in that they compress, expand outward and snap inward over the frame bars or rods. This swivel lock material can be plastic or the like.

Lock 26 has a body 85, a frame channel 98, and channel side walls 103. The lower swivel channel side walls 103 are pivotally attached to one of the main-frame side members 104 by a pivotal coupling or fastener 30. The lower swivel body 85 is attached to an adjacent first frame stand segment side support 62 by a fastener 28. Fastener 28 fixes frame bar 62 on swivel lock 26. Swing arm lock 33 (FIG. 4B) and swivel lock 26 combine to form a double lock structure for the lower frame stand 22 and the main frame rails 105. See FIG. 1.

In one preferred embodiment, side support 62 of frame stand 22 is attached to swivel lock 26 by inserting a terminal end of side support 62 into a cylindrical cavity 100 within the lower swivel body 85. A fastener or coupling 30 fixes side support 62 to swivel body 85. The opening of the cavity 100 defines a shape that matches the shape defined by the terminal end of side support 62. The walls of cavity 100 define a shape that matches a portion of the side support 62. Once the side support 62 is inserted into the cavity 100, a fastener or coupling 92 prevents movement of the side support 62 within the cavity 100. The cavity 100 is positioned such that an axial centerline through the cavity 100 is perpendicular to an axial centerline through a swivel lock frame channel 98. Frame bar or rail 104 rotates in and out of frame channel 98.

The frame channel 98 is distal with respect to the opening of the cylindrical cavity 100 and fixed pin 30 and the channel defines a shape that closely fits around side member 104. Channel 98 has a longitudinal open mouth to capture a sizable segment of frame rail 104. In one embodiment, channel 98 includes two detents 96 on either side of the wall of the frame channel 98. The detents protrude or extend inboard into the frame channel 98 defining longitudinal or axial swivel channel mouth 97.

The swivel channel mouth 97 has a cross sectional dimension that is smaller than the cross-sectional dimension of side rail member 104. Rail pivots in the channel. The size of the mouth is such that when frame segment 16 is fully extended with respect to the member rail 104 (FIG. 1) and rail 104 is in channel 98, detents 96 retain rail member 104 in channel 98. In another of embodiment, channel 98 includes only one detent 96. The channel 98 may operate with no detents. However, the detents provide a further lock system for cart 10.

Detent 96 may have various shapes and sizes. In one embodiment, each detent 96 may be elongated and extend along the longitudinal mouth of channel 98. In other embodiments, the detent may be circular, a rivet, or any other shape that reduces the cross sectional dimension of the mouth 97. Each channel facing detent 96 is typically fabricated from material that is resilient in that they can expand and rebound or return to their original shape. Each detent 96 is sized such that when segment 16 is rotated from its collapsed position to its fully extended position, a force perpendicular to an axial centerline through channel 98 is needed to cause side member 104 to expand the detent(s) 96 slightly outboard, moving the sidewalls or channel 98 to allow the main-frame side rail member 104 to enter or leave channel 98. Once side rail member 104 is in channel 98, the detent(s) 96 rebound inboard to their original shape thereby locking the frame rail member 104 into channel 98. To rotate the side rail member 104 from the fully extended locked position to the collapsed position, a force perpendicular to an axial centerline through channel 98 must be applied to cause the main-frame side rail member 104 to expand the channel and move the detents slightly to allow the rail member 104 to pass through channel mouth 97 and pass the detent(s) 96.

The stand swivel lock 27 in FIG. 3B has a body 185, a frame channel 198, and channel side walls 1103. The stand swivel channel side walls 1103 are pivotally attached to one of the side frame supports 62 by a pivotal fastener or coupling 29. A fastener or coupling 32 fixes the stand swivel body 185 to an adjacent second frame stand segment side leg 61.

In one preferred embodiment, the second frame stand segment side leg 61 is attached to the stand swivel lock 27 by inserting a terminal end of side leg 61 into a cavity 1100 within the stand swivel body 185 and fixing the side leg 61 to body 185 with a fastener 32. The opening of the cavity 1100 defines a shape that closely matches the shape defined by terminal end of the side leg 61. The interior walls of the cavity 1100 define a shape that closely matches a portion of the terminal end of side leg 61. Once the side leg 61 is inserted into the cavity 1100, fastener or coupling 32 prevents movement of the side leg 61 within the cavity 1100. The cavity 1100 is positioned such that an axial centerline through the cavity 1100 is perpendicular to an axial centerline through frame channel 198.

The channel 198 defines a shape that can closely fit around first frame stand side support 62. In one of the preferred embodiments, channel 198 includes two detents 196. The detents 196 are positioned on either side of channel 198 and protrude inboard from the plane of the walls of the frame channel 198 to define a stand swivel channel mouth 197.

Channel mouth 197 has a cross sectional dimension that is smaller than the cross-sectional dimension of the side support 62. The size of the channel mouth is such that when the frame segment 18 (FIG. 1) is fully extended with respect to the first stand frame segment 16 and support bar 62 is positioned in the channel 198, the detents 196 retain the frame support 62 in the channel 198. In another embodiment, the channel 198 includes only one detent 196. Channel 198 may have no detents.

The detents 196 may have various shapes and sizes. Detent 196 may be elongated and run along the channel. Detent 196 may be circular bump or ridge or a rivet, a pin, or any other shape that reduces the cross sectional dimension of mouth 197. The detent(s) 196 are resilient in that they can compress and rebound to its original shape. The detent(s) 196 are sized such that when the frame segment 16 is rotated from its collapsed position to its fully extended L-position, a force perpendicular to an axial centerline through channel 198 is needed to cause the support 62 to expand the channel by acting against detents to allow the side support 62 to pass the detent(s) 196 and into the channel 198.

Once first frame stand segment side support 62 is located in the channel 198, the detent(s) 196 rebound to their original shape thereby locking the side support 62 into the channel 198. To rotate the side support 62 from its fully extended position to the collapsed position, a force perpendicular to an axial centerline through the channel 198 is applied to cause the side support 62 to compress the detent(s) 196 slightly to allow the side support 62 to pass the detent(s) 196.

Figure 4A:
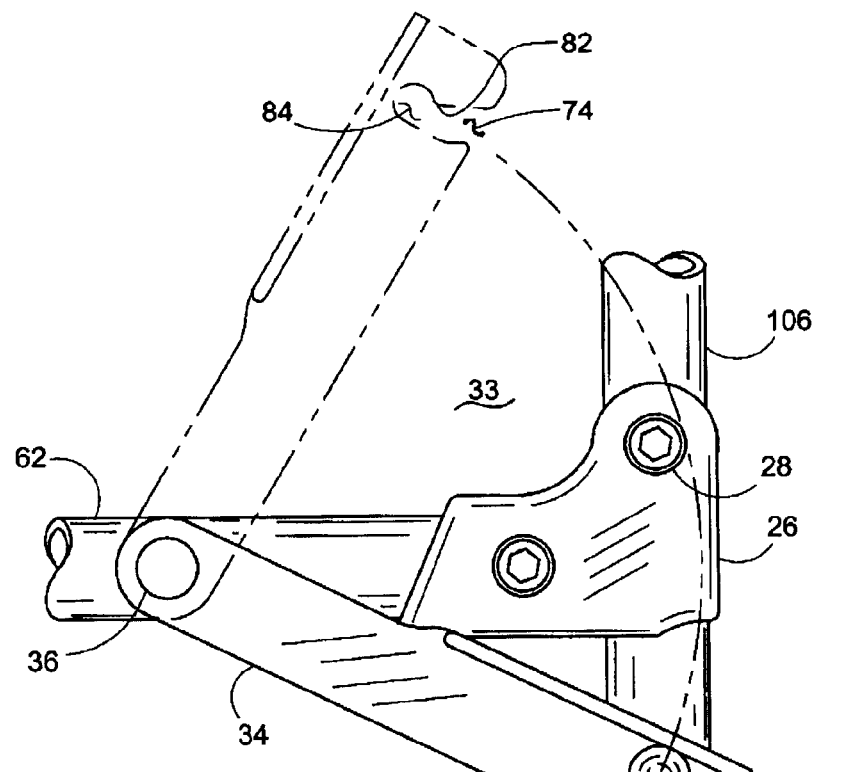
FIG. 4A diagrammatically illustrates a side view of one of the preferred embodiments of the lower swing arm safety latch system, in the locked position, that attaches the first frame stand side supports to the main-frame side members (the unlocked position shown in phantom lines).
Figure 4B:
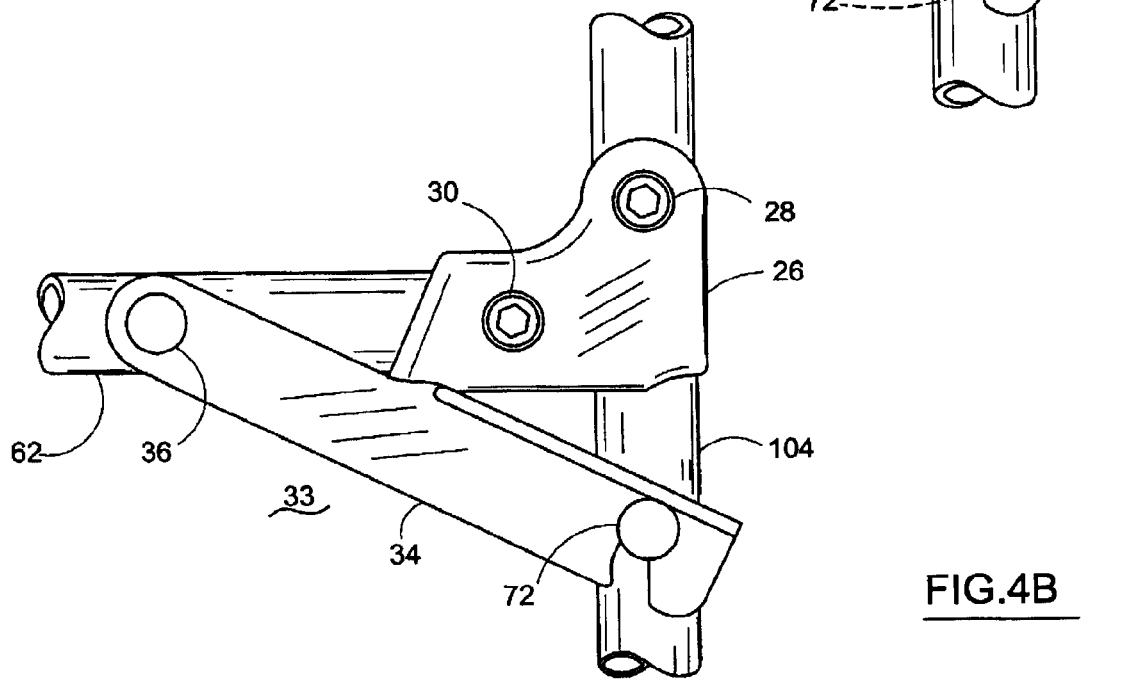
FIG. 4B diagrammatically illustrates a side view of one of the preferred embodiments of the lower swing arm safety latch system in the locked position.

FIG. 4A diagrammatically illustrates a side view of one of the preferred embodiment of the lower swing arm safety latch system 33. In the unlocked position, latch 33 attaches frame side supports 62 to frame main members 104. In one embodiment, two swing latch systems 33 operate on the opposing side rail bars 104. FIG. 4B diagrammatically illustrates a side view of one preferred embodiment of the lower swing arm safety latch system 33 in the locked position.

The latch system 33 includes an elongated latch swing arm 34 with a latch capture mouth 74 at one end thereof. The other end of arm 34 is pivotally mounted, by a pivotal fastener 36, to one of the first frame stand side supports 62. The latch system 33 also includes a pin 72 on frame rail bar 104 as explained later.

The capture mouth 74 of the swing arm 34 is defined by a latch tooth 82. The latch tooth 82 extends inboard into mouth 74. One embodiment has tooth 82 inboard towards the pivotal fastener 36. The tooth decreases the cross sectional dimension of the capture mouth 74 and defines a capture throat 84. The capture throat 84 is distal with or inboard respect to the capture mouth 74. The swing arm 34 cooperates with latch pin 72. The latch pin 72 on frame rail bar 104 is sized and positioned so that when the swing arm 34 is swung from the unlocked position (phantom line FIG. 4A) to the locked position (FIG. 4B), the arm swings and the latch pin 72 passes though the capture mouth 74 into locking throat 84.

The pin 72 can have various different shapes and can be located on different positions on the cart (above or below lock 26) as long as the swing arm co-acts with the pin. In one embodiment, the pin 72 is located on the inside of the lower portion of an adjacent frame bar side rail member 104. In another embodiment, the latch pin 72 is located on adjacent outside of the main-frame side rail support 104. In one embodiment, the pin 72 can be positioned below the swivel lock 26, and in another embodiment the pin 72 can be located above the swivel lock 26.

The pin 72 protrudes or extends inward from the side member 104 toward the opposing side rail member 104 (as shown is FIG. 6) (inboard with respect to cart space 105). Pin 72, shown in phantom lines in FIG. 4A, has a stem coasting with mouth 74 of arm 34, and has an enlarged cap best shown in FIG. 4B. The cap is at the end of the stern. The swing latch arm 34 is rotatably attached on the same side of side support 62 (the inboard side) as latch pin 72. The pin is positioned such that upon pivotal movement of the swing arm 34 to its locked or closed position, the arm swings, and capture mouth 74 and the capture throat 84 accepts and retains the pin 72. In this locked position, the latch swing arm 34 secures frame segment 16 of stand 22 (FIG. 6) in its fully extended L-position with respect to the plane of the main-frame 14.

Lower swivel lock 26 rotatably attaches the first frame stand side support bar 62 to main-frame side rail member 104 swivel lock is somewhat resilient in that it compresses. The compression is coaxial along the longitudinal centerline 9a, 9b (FIG. 3A) of frame support bar 62 which is part of frame stand 16 (FIG. 6). The compressive force is perpendicular or normal to frame channel 98 and the channel side segment 7 (FIG. 3A) is subjected to the greatest compressive force during the latching operation. For the latch pin 72 to pass the tooth 82 and be retained in the throat 84 (FIG. 4A), the latch swing arm 34 must generate a compressive force during the locking operation wherein the compressive force is normal to an axial centerline through swivel lock channel 98 such that the force compresses the lower swivel body 26 at channel side 7. When stand segment 22 is fully extended and the latch system 33 is its locked position (FIG. 4B), stand segment 22 does not move when longitudinal forces, parallel to the longitudinal aspect of the main-frame 14, act upon stand segment 22. The need to apply compressive force the channel face 7 provides tactile feedback to the user that the stand is fully locked by the swing arm lock 33.

FIG. 5A diagrammatically illustrates a side view the cart 10 as a table and FIG. 5B diagrammatically illustrates a side view of the cart 10 in an upright position.

In FIG. 5A, the cart 10 is adapted for use as a table 2. In this position, the main-frame structure 14 positioned horizontally with respect to ground plane 1. The upper framework side elements 108 (of upper frame 17, FIG. 6) and the first frame stand segment side supports 62 (of lower stand 16, FIG. 6) act as the legs for the table. Panel 20 acts as a substantially flat area onto which items can be placed.

In FIG. 5B, the cart 10 is in its fully extended upright position 3. The main-frame 14 is substantially vertical with respect to the surface of the ground plane 1. The second frame stand side legs 18 provide one element of support and wheel system 12 provides the other element for the base of the cart. In this position, items can be placed onto the lower frame stand frame segment 16. See FIG. 6. In one embodiment, padding or cushioned sleeve 38 (FIG. 6) surrounds cross frame member 15 and provides comfort to the user when he or she pulls the cart 10. A user can grasp sleeve 38 of main-frame cross member 15 and use the cart to carry items to a different location.

FIG. 6 diagrammatically illustrates a perspective view of the cart 10 in accordance with one preferred embodiment of the present invention.

The wheel system 12 can have various different configurations. The wheel system 12 is rotatably mounted near the bottom portions of side frame members 104. The wheel system 12 is of sufficient width and height to allow the cart to be pulled over soft sand when the device is loaded. In one embodiment, the wheel system is a pair of wheels including a left wheel 66 and a right wheel 68 rotatably attached near a terminal end of each of side members 104. The wheels 66, 68 are attached using an axle 70 that is pivotally mounted to and spanning side rail members 104 at a point of attachment 71 below the swing latch pin 72. The axle 70 closes rectangular cart space 105. The wheels 66, 68 are attached to the outside of side rail members 104. In another embodiment, the wheels 66, 68 can be rotatably mounted to side rail members 104 of the structure 14 using pivotal couplings or fasteners without an axle 70. In another embodiment, the wheel system 12 includes a single cylindrical roller rotatably attached near a terminal end of each of opposing side members 104. Otherwise, the cart may have 3 or more wheels.

In one embodiment, the main-frame 14 has a panel 20 that covers the cart space 105 formed by left and right main-frame rail members 104 and cross bar member 15. In one embodiment, two opposing sides of the panel 20 are fixed to the main-frame 14. The panel 20 can be positioned in cart space 105 between lower stand swivel 26 and pivotal fastener or coupling 48. The panel can be made of various different materials. For example, the panel 20 can be a cloth panel, a rigid panel, or a flexible panel. If the panel 20 is cloth or a flexible material, the panel can be attached to the main-frame by sewing the panel 20 onto the main-frame structure 14. The panel may also be fabricated from any material that is suitable to act as a surface for a table. In another embodiment, the cart 10 has no panel 20 in space 105.

Returning to FIG. 1, panel 20 has a mesh bag or pouch 22 attached to its outside or rear surface. The pouch forms a receptacle to store miscellaneous items, such as beach towels or cups. The pouch 22 can be sewn onto surface of the flexible panel 20 or attached by any other suitable method. In one embodiment, a strap or elongated strip of material 24 can be attached near the bottom portions of the flexible panel 20. The strap 24 can be fabricated from leather, rope, bungee cord material or any other material suitable for tying items.

Upper framework 17 is attached near the upper portion of the main-frame structure 14. See FIG. 6. Framework 17 can be made of several elements or struts. Framework bars or rods can have various different cross-sectional shapes and sizes. In one embodiment, upper framework 17 can be U-shaped, wherein a rigid cross bar element 109 is at the terminal ends of upper framework side elements 108 and defines a U-shape. In another preferred embodiment, the framework elements can define the letter H with intermediate cross bar members. Multiple cross members can span the upper framework space. The terminal ends of side elements 108 rotatably attach to upper portions of the side rail members 104 by a suitable pivotal fastener or coupling 40.

In one embodiment, main-frame structure 14 can have an upper auxiliary cross member 41 (FIG. 6) that spans opposing side members 104 between cross member 15 and panel 20. Upper frame rails 108 (three rails 108 forming a U-shape) are illustrated as being partly broken away to show (i) left frame rail bar 108 and (ii) cross member 41. Terminal ends of auxiliary cross member 41 are attached to side rail members 104. Rail elements 108 are rotatably attached to rails 104. Auxiliary cross member 41 can be fabricated from material similar to the other frame bar members. A bag or pouch 41a hangs from cross rail piece 41. In another embodiment, the cross rail member 41 can be attached above or below members 108.

The lower frame stand 22 is pivotally attached to lower portions of the main-frame structure by the swivel lock 26. In one embodiment, two lower swivel locks 26 operate on opposing frame rail members 104. The frame stand 22 includes frame segment 16 which is pivotally attached to frame segment 18 by stand swivel lock 27 (see FIG. 3B). When the lower frame stand is fully extended, the cart is able to stand upright.

The lower frame segment 16 may include several supports or struts. The support bars can have various different cross-sectional shapes and sizes. In one of the embodiment, segment 16 can be U-shaped, wherein a rigid first cross support 64 is at a terminal end of opposing side frame supports 62 defining the U-shape. The supports can also define the shape of a letter H with cross bars (see FIG. 6) or can define a square or rectangle. The segment 16 can also include a cross support 58 spanning opposing side supports 62 between first cross support 64 and lower swivel lock 26. In another embodiment, segment 16 only has one cross support.

The first frame stand 22 (FIG. 6) may also include auxiliary supports or frame elements 60. The auxiliary supports 60 can be long thin bars made from tubular steel or other metallic composites. However, the auxiliary supports 60 can be made from any material suitable for providing support. In one embodiment, a plurality of auxiliary elements or supports 60 span from cross bar supports 64, 58 between side supports 62. In another embodiment, the auxiliary supports or members 60 can span the side supports 62 between the cross bar supports 64, 58. In yet another embodiment, the auxiliary supports 60 can be positioned to define a shape of a cross with the ends of the supports 60 attaching to the cross supports 64, 58 and the side supports 62.

Stand leg segment 18 is rotatably or pivotally attached to the first frame stand 16 by the stand swivel 27. Segments 16, 18 define lower stand 22. In one embodiment, two swivel locks 27 operate on opposing side supports 62. The leg segment 18 can be made from several elements or pieces. Like the other frame pieces, the bars forming second frame stand frame segment 18 can have various different cross-sectional shapes and sizes.

In one embodiment, leg stand segment 18 can be U-shaped, wherein a rigid cross support 25 is the terminal ends of opposing rigid side legs 61 defining a U-shape. In another embodiment, opposing side legs 61 and cross bar 25 can be arranged to define an H-shape or can define a square or a rectangle. In another embodiment, leg segment 16 has opposing side frame legs 61 with no cross bar support.

When the cart 10 is in the upright position as in FIG. 6 and FIG. 1, leg segment 18 is fully extended (to an L-position) or substantially perpendicular with respect to stand segment 16, and segment 16 is fully extended (to an L-position) or sustainally perpendicular with respect to main-frame structure 14. The auxiliary support legs 60 provide physical support to leg segment 16 when longitudinal forces parallel to the longitudinal aspect of the main-frame 14 act upon frame stand 22.

Returning to FIG. 1, a bungee cord or suitable strap 50 can be attached to the upper auxiliary cross member 41 and which may be used to secure articles to the Cart 10.

The claims appended hereto are meant to cover various embodiments of the invention illustrated in the drawings and further described herein within the scope and spirit of the present invention. The claims cover modifications of the invention with the scope and spirit of the invention.

What is claimed is:

1. A foldable light duty cart adopted to carry items such as beach chairs, coolers, towels, blankets and food stuffs comprising:

a main-frame structure including opposing rigid main-frame side frame members with at least one rigid main-frame cross bar member spanning the main-frame side members;

a wheel system rotatably mounted near bottom portions of said main-frame side members;

a panel attached between said main-frame side members;

a pivotally mounted upper framework which is pivotally attached to said main-frame side members, including opposing rigid upper framework side frame elements and at least one rigid upper framework cross bar element spanning said upper framework side elements;

a pivotally mounted lower frame stand which is pivotally attached to said main-frame side members, said lower frame stand having first and second frame stand segments;

said first frame stand segment pivotally attached to said main-frame side members, including opposing rigid first frame stand side supports and at least one first frame stand cross bar support therebetween;

said second frame stand segment pivotally attached to said first frame stand segment at said first frame stand side supports, said second frame stand segment including opposing rigid second frame stand legs;

a lower swivel lock having body, a frame channel and channel side walls, the lower swivel channel side walls pivotally attached to one of said main-frame side members and said lower swivel body attached to an adjacent first frame stand side support, the lower swivel frame channel capturing said main-frame side member therein when said lower frame stand and the first frame stand segment is substantially perpendicular to said main-frame side member in a fully extended position, and, when said main-frame side member is not captured in said lower swivel frame channel, said lower frame stand is adapted to swing to a collapsed position near said main-frame side member, said lower swivel frame channel having at least one lower swivel detent therein to capture and lock said main-frame side member when in said fully extended position;

a stand swivel lock having a body, a frame channel and channel side walls, the stand swivel channel side walls pivotally attached to one of said first frame stand side supports and said stand swivel body attached to an adjacent second frame stand leg, the stand swivel frame channel capturing said first frame stand side support therein when said second frame stand segment is substantially perpendicular to said first frame stand side support and in a fully extended cart-standing position, and, when said first frame stand side support is not captured in said stand swivel frame channel, said second frame stand segment is adapted to swing to a collapsed position, said stand swivel frame channel having at least one stand swivel detent therein to capture and lock said first frame stand side support when in said fully extended position;

an off center swing hinge lock system between one of said main-frame side members and an adjacent upper framework side element;

a lower swing arm safety latch system between one of said first frame stand side supports and an adjacent main-frame side member, said lower swing arm latch having a swing arm with a catch mouth at one end thereof and the other end thereof pivotally mounted to said one of said first frame stand side supports, a pin on said adjacent main-frame side member at a location such that upon rotation of said swing arm, said catch mouth accepts and retains said pin therein and said lower swing arm latches said first frame stand to said main-frame to maintain said first frame stand in said fully extended position with respect to said main-frame.

2. A foldable light duty cart as claimed in claim 1, wherein said off center swing hinge lock system includes a first hinge arm and a second hinge arm respectively pivotally coupled to said upper framework side element and said main-frame side member, said first and second hinge arms pivotally attached to each other at an arm pivot point;

said first hinge arm having a stop and said second hinge arm having an edge, said stop coacting with said edge and forming an off center hinge lock when said first and second hinge arms are fully extended in a locked position and said arm pivot point being inboard with respect to an imaginary line through the pivotal coupling of said first hinge arm and said upper framework side element and the pivotal coupling of said second hinge arm and said main-frame side member.

3. A foldable light duty cart as claimed in claim 2, wherein when said off center swing hinge lock system is in a locked position, said arm pivot point is closer to said pivotal attachment between said main-frame side member and said upper framework side element than when said off center swing hinge is in an unlocked position.

4. A foldable light duty cart as claimed in claim 3, wherein in said fully extended and locked position, said first and second hinge arms are extended generally linearly with respect to each other, and in a second collapsed position said first and second hinge arms are collapsed and are generally adjacent to each other, said stop defined as a lip on an edge of said first hinge arm,
said arm pivot point being spaced away from said lip,
said first hinge arm including an a first detent,
said second hinge arm having a second detent complementary to said first detent,
said first and second detents interlocking and said second hinge arm edge abutting said lip when said first hinge arm and second hinge arm is fully extended in a locked position.

5. A foldable light duty cart as claimed in claim 1 wherein said wheel system comprises a pair of wheels, a respective wheel of said pair of wheels rotatably mounted near a terminal bottom end of each of said main-frame side members.

6. A foldable light duty cart as claimed in claim 1 wherein said main-frame side members and said main-frame cross member partly enclose a cart space and said panel covers a portion of said enclosed cart space, said panel is one of a cloth panel, a rigid panel and a flexible panel.

7. A foldable light duty cart as in claim 1, wherein first frame stand segment has a collapsed position when said first frame stand side supports are rotated to a collapsed position adjacent to said main-frame side members.

8. A foldable light duty cart as in claim 1, wherein second frame stand segment has a collapsed position when said second frame stand side legs are rotated to a collapsed position adjacent to said first frame stand side supports.

9. A foldable light duty cart as in claim 1, wherein second frame stand segment includes either:
two second stand frame stand legs with a frame stand cross bar; or
a U-shaped structure formed by said opposing second frame stand legs and a frame stand cross bar therebetween distal to said stand swivel joining said second frame stand legs and said first frame stand.

10. A foldable light duty cart as in claim 1, wherein said lower swivel lock comprises a soft lock wherein said lower swivel frame channel is resilient, and said lower swivel frame channel carrying said lower swivel detent defines a channel mouth which is smaller than a cross-sectional dimension of said main-frame side members such that in said fully extended position, said main-frame side member is locked into said lower swivel frame channel with said lower swivel detent.

11. A foldable light duty cart as in claim 1, wherein said stand swivel lock comprises a soft lock wherein said stand swivel frame channel is resilient, and said stand swivel frame channel carrying said stand swivel detent defines a channel mouth which is smaller than a cross-sectional dimension of said first stand side supports such that in said fully extended position, said first stand side support is locked into said stand swivel frame channel with said stand swivel detent.

12. A foldable light duty cart as claimed in claim 1 wherein said lower swivel body is compressibly resilient, and wherein said latch capture mouth of said lower swing arm safety latch system further includes
    a latch tooth defined by the said capture mouth and a latch capture throat thereat,
    said capture mouth of said swing arm is sized so that said latch pin can pass through said mouth and over said latch tooth only if said latch tooth generates a force during a locking operation normal to an axial centerline through said lower swivel frame channel which compresses said lower swivel body.

13. A foldable light duty cart as claimed in claim 1, wherein the cart has a pouch attached to said panel.

14. A foldable light duty cart as claimed in claim 1, wherein said main-frame cross member is located between co-extensive terminal ends of said main-frame side members, opposite said wheel system, said cart including a cushioned sleeve about said main-frame cross member.

15. A foldable light duty cart as claimed in claim 1, wherein lower swivel frame channel has two inwardly depending lower swivel detents on each opposing sides of said lower swivel frame channel to capture said main-frame side member therein.

16. A foldable light duty cart as claimed in claim 1, wherein stand swivel frame channel has two inwardly depending stand swivel detents on each opposing sides of said stand swivel frame channel to capture said first frame stand side support therein.

17. A foldable light duty cart as in claim 1, wherein said first frame stand segment further includes multiple first frame stand cross bar supports.

18. A foldable light duty cart as claimed in claim 1, wherein said first frame stand segment includes a plurality of rigid auxiliary frame supports spanning said multiple first frame stand cross bar supports.

19. A foldable light duty cart as claimed in claim 1, wherein said cart has two said lower swivel locks, two said stand swivel locks, two said off center swing hinge lock systems, and two said lower swing arm safety latch systems.

20. A foldable light duty cart as claimed in claim 4 wherein said wheel system comprises a pair of wheels, a respective wheel of said pair of wheels rotatably mounted near a terminal bottom end of each of said main-frame side members.

21. A foldable light duty cart as claimed in claim 20 wherein said main-frame side members and said main-frame cross member partly enclose a cart space and said panel covers a portion of said enclosed cart space, said panel is one of a cloth panel, a rigid panel and a flexible panel.

22. A foldable light duty cart as in claim 21, wherein first frame stand segment has a collapsed position when said first frame stand side supports are rotated to a collapsed position adjacent to said main-frame side members, second frame stand segment has a collapsed position when said second frame stand side legs are rotated to a collapsed position adjacent to said first frame stand side supports, and second frame stand segment includes either:
    two second frame stand legs with a frame stand cross bar; or
    a U-shaped structure formed by said opposing second frame stand legs and a frame stand cross bar therebetween distal to said stand swivel joining said second frame stand legs and said first frame stand.

23. A foldable light duty cart as in claim 22, wherein said lower swivel lock comprises a soft lock wherein said lower swivel frame channel is resilient, and said lower swivel frame channel carrying said detent defines a channel mouth which is smaller than a cross-sectional dimension of said main-frame side members such that in said fully extended position, said main-frame side member is locked into said lower swivel frame channel with said detent, said stand swivel lock comprises a soft lock wherein said stand swivel frame channel is resilient, and said stand swivel frame channel carrying said detent defines a channel mouth which is smaller than a cross-sectional dimension of said first stand side supports such that in said fully extended position, said first stand side support is locked into said stand swivel frame channel with said detent, and said lower swivel body is compressibly resilient, and wherein said latch capture mouth of said lower swing arm safety latch system further includes
    a latch tooth defined by the said capture mouth and a latch capture throat thereat,
    said capture mouth of said swing arm is sized so that said latch pin can pass through said mouth and over said latch tooth only if said latch tooth generates a force during a locking operation normal to an axial centerline through said lower swivel frame channel which compresses said lower swivel body.

24. A foldable light duty cart as claimed in claim 23, wherein said main-frame cross member is located between co-extensive terminal ends of said main-frame side members, opposite said wheel system, said cart including a cushioned sleeve about said main-frame cross member.

25. A foldable light duty cart as claimed in claim 24, wherein lower swivel frame channel has two inwardly depending detents on each opposing sides of said lower swivel frame channel to capture said main-frame side member therein, and stand swivel frame channel has two inwardly depending detents on each opposing sides of said stand swivel frame channel to capture said first frame stand side support therein.

26. A foldable light duty cart adopted to carry items such as beach chairs, coolers, towels, blankets and food stuffs comprising:
    a main-frame structure including opposing rigid main-frame side frame members with at least one rigid main-frame cross bar member spanning the main-frame side members;
    a wheel system rotatably mounted near bottom portions of said main-frame side members;
    a panel attached between said main-frame side members;
    a pivotally mounted upper framework which is pivotally attached to said main-frame side members, including opposing rigid upper framework side frame elements and at least one rigid upper framework cross bar element spanning said upper framework side elements;

a pivotally mounted lower frame stand which is pivotally attached to said main-frame side members, said lower frame stand having first and second frame stand segments;

said first frame stand segment pivotally attached to said main-frame side members, including opposing rigid first frame stand side supports and at least one first frame stand cross bar support therebetween;

said second frame stand segment pivotally attached to said first frame stand segment at said first frame stand side supports, said second frame stand segment including opposing rigid second frame stand legs;

a lower swivel lock having body, a frame channel and channel side walls, the lower swivel channel side walls pivotally attached to one of said main-frame side members and said lower swivel body attached to an adjacent first frame stand side support, the lower swivel frame channel capturing said main-frame side member therein when said lower frame stand and the first frame stand segment is substantially perpendicular to said main-frame side member in a fully extended position, and, when said main-frame side member is not captured in said lower swivel frame channel, said lower frame stand is adapted to swing to a collapsed position near said main-frame side member;

a stand swivel lock having a body, a frame channel and channel side walls, the stand swivel channel side walls pivotally attached to one of said first frame stand side supports and said stand swivel body attached to an adjacent second frame stand leg, the stand swivel frame channel capturing said first frame stand side support therein when said second frame stand segment is substantially perpendicular to said first frame stand side support and in a fully extended cart-standing position, and, when said first frame stand side support is not captured in said stand swivel frame channel, said second frame stand segment is adapted to swing to a collapsed position;

an off center swing hinge lock system between one of said main-frame side members and an adjacent upper framework side element;

a lower swing arm safety latch system between one of said first frame stand side supports and an adjacent main-frame side member, said lower swing arm latch having a swing arm with a catch mouth at one end thereof and the other end thereof pivotally mounted to said one of said first frame stand side supports, a pin on said adjacent main-frame side member at a location such that upon rotation of said swing arm, said catch mouth accepts and retains said pin therein and said lower swing arm latches said first frame stand to said main-frame to maintain said first frame stand in said fully extended position with respect to said main-frame, said off center swing hinge lock system includes a first hinge arm and a second hinge arm respectively pivotally coupled to said upper framework side element and said main-frame side member, said first and second hinge arms pivotally attached to each other at an arm pivot point, said first hinge arm having a stop and said second hinge arm having an edge, said stop coacting with said edge and forming an off center hinge lock when said first and second hinge arms are fully extended in a locked position and said arm pivot point being inboard with respect to an imaginary line through the pivotal coupling of said first hinge arm and said upper framework side element and the pivotal coupling of said second hinge arm and said main-frame side member.

27. A foldable light duty cart as claimed in claim 26, wherein when said off center swing hinge lock system is in a locked position, said arm pivot point is closer to said pivotal attachment between said main-frame side member and said upper framework side element than when said off center swing hinge is in an unlocked position.

28. A foldable light duty cart as claimed in claim 27, wherein in said fully extended and locked position, said first and second hinge arms are extended generally linearly with respect to each other, and in a second collapsed position said first and second hinge arms are collapsed and are generally adjacent to each other,
   said stop defined as a lip on an edge of said first hinge arm,
   said arm pivot point being spaced away from said lip,
   said first hinge arm including an a first detent,
   said second hinge arm having a second detent complementary to said first detent,
   said first and second detents interlocking and said second hinge arm edge abutting said lip when said first hinge arm and second hinge arm is fully extended in a locked position.

29. A foldable light duty cart as claimed in claim 28 wherein said wheel system comprises a pair of wheels, a respective wheel of said pair of wheels rotatably mounted near a terminal bottom end of each of said main-frame side members.

30. A foldable light duty cart as claimed in claim 29 wherein said main-frame side members and said main-frame cross member partly enclose a cart space and said panel covers a portion of said enclosed cart space, said panel is one of a cloth panel, a rigid panel and a flexible panel.

31. A foldable light duty cart as in claim 30, wherein first frame stand segment has a collapsed position when said first frame stand side supports are rotated to a collapsed position adjacent to said main-frame side members, second frame stand segment has a collapsed position when said second frame stand side legs are rotated to a collapsed position adjacent to said first frame stand side supports, and second frame stand segment includes either:
   two second frame stand legs with a frame stand cross bar; or
   a U-shaped structure formed by said opposing second frame stand legs and a frame stand cross bar therebetween distal to said stand swivel joining said second frame stand legs and said first frame stand.

32. A foldable light duty cart as in claim 31, wherein said lower swivel lock comprises: a soft lock wherein said lower swivel frame channel is resilient, and said lower swivel frame channel having at least one detent therein to capture and lock said main-frame side member when in said fully extended position, said lower swivel detent defines a channel mouth which is smaller than a cross-sectional dimension of said main-frame side members such that in said fully extended position, said main-frame side member is locked into said lower swivel frame channel with said lower swivel detent;
   said stand swivel lock comprises a soft lock wherein said stand swivel frame channel is resilient, and said stand swivel frame channel having at least one detent therein to capture and lock said first frame stand side support when in said second frame stand segment is in a fully extended position, said stand swivel detent defines a channel mouth which is smaller than a cross-sectional dimension of said first stand side supports such that in fully extended position, said first stand side support is locked into said stand swivel frame channel with said stand swivel detent;

said lower swivel body is compressibly resilient, and wherein said latch capture mouth of said lower swing arm safety latch system further includes a latch tooth defined by the said capture mouth and a latch capture throat thereat, said capture mouth of said swing arm is sized so that said latch pin can pass through said mouth and over said latch tooth only if said latch tooth generates a force during a locking operation normal to an axial centerline through said lower swivel frame channel which compresses said lower swivel body.

33. A foldable light duty cart as claimed in claim 32, wherein said main-frame cross member is located between co-extensive terminal ends of said main-frame side members, opposite said wheel system, said cart including a cushioned sleeve about said main-frame cross member.

34. A foldable light duty cart as claimed in claim 33, wherein lower swivel frame channel has two inwardly depending lower swivel detents on each opposing sides of said lower swivel frame channel to capture said main-frame side member therein, and stand swivel frame channel has two inwardly depending stand swivel detents on each opposing sides of said stand swivel frame channel to capture said first frame stand side support therein.

35. A foldable light duty cart as in claim 34, wherein said first frame stand segment further includes multiple first frame stand cross bar supports.

36. A foldable light duty cart as claimed in claim 35, wherein said first frame stand segment includes a plurality of rigid auxiliary frame supports spanning said multiple first frame stand cross bar supports.

37. A foldable light duty cart as claimed in claim 36, wherein said cart has two said lower swivel locks, two said stand swivel locks, two said off center swing hinge lock systems, and two said lower swing arm safety latch systems.

38. A foldable light duty cart adopted to carry items such as beach chairs, coolers, towels, blankets and food stuffs comprising:

a main-frame structure including opposing rigid main-frame side frame members with at least one rigid main-frame cross bar member spanning the main-frame side members;

a wheel system rotatably mounted near bottom portions of said main-frame side members;

a pivotally mounted upper framework which is pivotally attached to said main-frame side members, including opposing rigid upper framework side frame elements and at least one rigid upper framework cross bar element spanning said upper framework side elements;

a pivotally mounted lower frame stand which is pivotally attached to said main-frame side members, said lower frame stand having first and second frame stand segments;

said first frame stand segment pivotally attached to said main-frame side members, including opposing rigid first frame stand side supports and at least one first frame stand cross bar support therebetween;

said second frame stand segment pivotally attached to said first frame stand segment at said first frame stand side supports, said second frame stand segment including opposing rigid second frame stand legs;

a lower swivel lock having body, a frame channel and channel side walls, the lower swivel channel side walls pivotally attached to one of said main-frame side members and said lower swivel body attached to an adjacent first frame stand side support, the lower swivel frame channel capturing said main-frame side member therein when said lower frame stand and the first frame stand segment is substantially perpendicular to said main-frame side member in a fully extended position, and, when said main-frame side member is not captured in said lower swivel frame channel, said lower frame stand is adapted to swing to a collapsed position near said main-frame side member, said lower swivel frame channel having at least one detent therein to capture and lock said main-frame side member when in said fully extended position;

a stand swivel lock having a body, a frame channel and channel side walls, the stand swivel channel side walls pivotally attached to one of said first frame stand side supports and said stand swivel body attached to an adjacent second frame stand leg, the stand swivel frame channel capturing said first frame stand side support therein when said second frame stand segment is substantially perpendicular to said first frame stand side support and in a fully extended cart-standing position, and, when said first frame stand side support is not captured in said stand swivel frame channel, said second frame stand segment is adapted to swing to a collapsed position, said stand swivel frame channel having at least one detent therein to capture and lock said first frame stand side support when in said fully extended position;

an off center swing hinge lock system between one of said main-frame side members and an adjacent upper framework side element;

a lower swing arm safety latch system between one of said first frame stand side supports and an adjacent main-frame side member, said lower swing arm latch having a swing arm with a catch mouth at one end thereof and the other end thereof pivotally mounted to said one of said first frame stand side supports, a pin on said adjacent main-frame side member at a location such that upon rotation of said swing arm, said catch mouth accepts and retains said pin therein and said lower swing arm latches said first frame stand to said main-frame to maintain said first frame stand in said fully extended position with respect to said main-frame.

* * * * *